United States Patent [19]

Dorier

[11] Patent Number: 4,928,469
[45] Date of Patent: May 29, 1990

[54] MODULAR CONSTRUCTION BLOCK

[76] Inventor: Marcel Dorier, "La Vinette" Saint-Denis d'Authou, 28480 Thiron-Gardais, France

[21] Appl. No.: 304,859

[22] Filed: Jan. 30, 1989

Related U.S. Application Data

[63] Continuation of Ser. No. 87,188, Aug. 20, 1987, abandoned.

[30] Foreign Application Priority Data

Aug. 26, 1986 [FR] France .................................. 86 12065

[51] Int. Cl.$^5$ .............................................. E04C 1/00
[52] U.S. Cl. ........................................ 52/607; 52/604; D25/117
[58] Field of Search .................... 52/606, 607, 604; D25/113, 114, 115, 116, 117

[56] References Cited

U.S. PATENT DOCUMENTS

| | | | |
|---|---|---|---|
| D. 186,373 | 10/1959 | Bedack et al. ............... | D25/116 |
| 722,712 | 3/1903 | Jasper ........................ | 52/605 |
| 750,561 | 1/1904 | Allerding .................... | 52/606 |
| 1,446,796 | 2/1923 | Henderson ................... | 52/606 |
| 1,524,146 | 1/1925 | Murray ....................... | 52/607 |
| 1,574,584 | 2/1926 | Lindner ...................... | 52/606 |
| 2,131,803 | 10/1938 | Henderson ................... | 52/606 |
| 3,165,750 | 1/1965 | Tell ............................ | 52/607 |
| 3,254,440 | 6/1966 | Duggar ....................... | 52/604 |
| 3,360,883 | 1/1968 | Glanzer ...................... | D25/113 |
| 3,417,533 | 12/1968 | Sparling ...................... | 52/607 |
| 3,488,880 | 1/1970 | Taylor ........................ | 446/85 |
| 3,548,600 | 12/1970 | Stolk, Jr. et al. ............. | 405/30 |
| 3,981,506 | 9/1976 | Daniel et al. ................ | 273/157 R |
| 4,479,740 | 10/1984 | Schaff et al. ................ | 405/30 |

FOREIGN PATENT DOCUMENTS 184109  11/1982  Japan .................................. 405/30

Primary Examiner—Michael Safavi
Attorney, Agent, or Firm—Sughrue, Mion, Zinn, Macpeak & Seas

[57] ABSTRACT

A modular block for making constructions, is essentially characterized by the fact that it comprises a body (1) having three groups of cylindrical hollows opening out respectively into three contiguous faces (2, 3, 4) of the cube, each group comprising at least two cylindrical hollows each of whose generator line is perpendicular to the face into which they open out, the two hollows including at least two lines in common and the section of each of them in a plane parallel to the face forming a partially closed curved surface suitable for preventing a cylinder of complementary shape to the corresponding hollow from radial displacement when such a cylinder is slid into said hollow. The invention is particularly applicable to building full scale models.

14 Claims, 4 Drawing Sheets

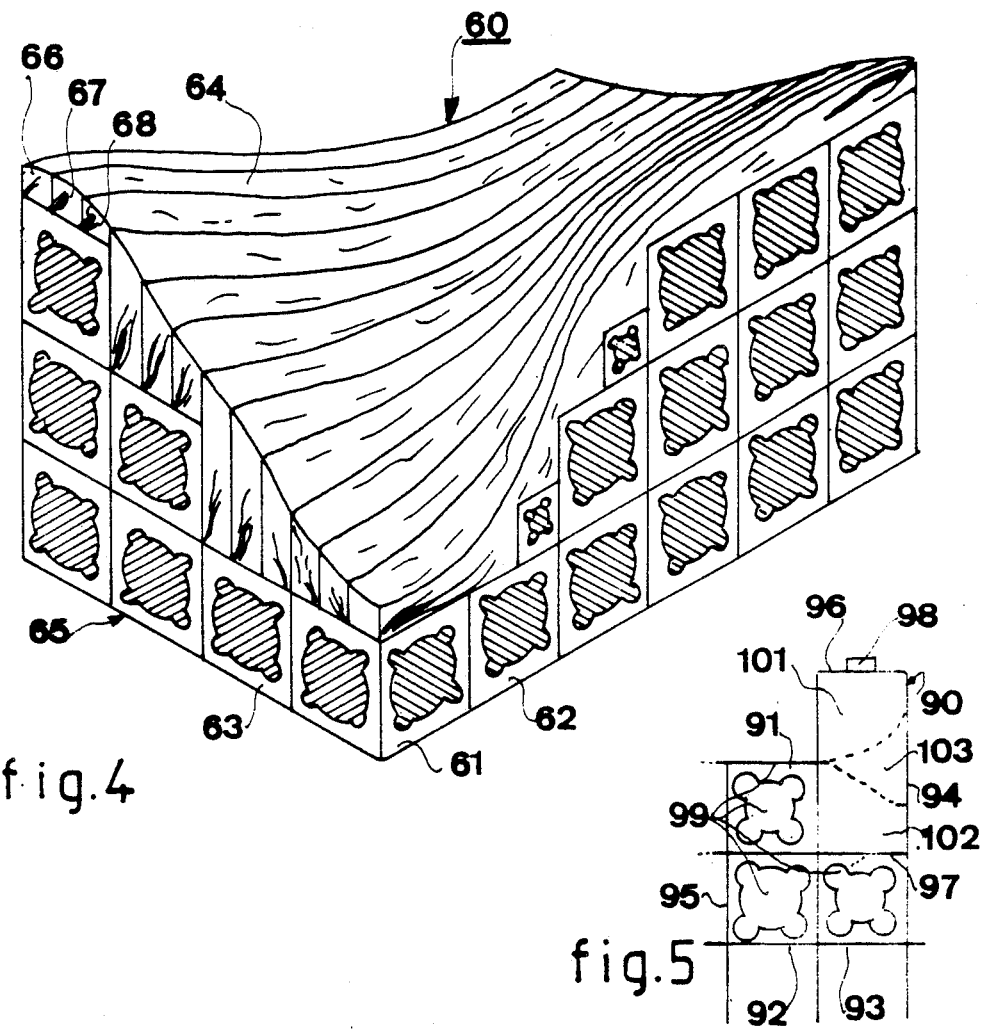

MODULAR CONSTRUCTION BLOCK

This is a continuation of application Ser. No. 087,188, filed Aug. 20, 1987.

The present invention relates to modular construction blocks for making bodies, and more particularly large bodies such as models of objects at life size or at substantially life size.

BACKGROUND OF THE INVENTION

Numerous enterprises market new products which need very special initial study. This applies to the motor, airplane, and space industries. In order to perform such studies, in particular before actually manufacturing such new products and even before making a prototype, these industries generally make a model (preferably at life size) of a product which has previously existed only on paper. These models are generally built by companies specializing in this type of work which have the required know-how and equipment.

These companies generally use a "solid" construction technique. They shape substances which are relatively easy to work, e.g. panels of wood, which are cut to the dimensions, shapes and sizes given in the manufacturer's plans. These panels are then applied against one another and may optionally be glued together.

A model made in this way gives the desired result, but suffers from a fairly severe drawback, namely its weight. Lighter models have therefore been made by making a frame using risers that are assembled by any appropriate means and then covering them with a "skin" to obtain a desired external shape. Although this technique makes it possible to obtain a lighter model, the model is not strong enough for some experiments, or even for transport, and that too is a serious drawback.

Thus, the present invention seeks to provide modular construction blocks for making products such as models which are both as rigid and as strong as products made using the "solid" technique, and also as light as products obtained using the technique of a frame covered by a "skin".

SUMMARY OF THE INVENTION

More precisely, the present invention provides a modular block for making constructions, characterized by the fact that it comprises a body having:

at least three plane faces such that the perpendiculars thereto form a rectangular frame of reference;

three groups of cylindrically-shaped hollows each opening out into one of said faces and each comprising at least two hollows, the generator line of each of the hollows in a group being parallel and perpendicular to the face into which they open out, said hollows within a group including two lines in common and each of them forms a partially closed curve suitable for preventing a cylinder of complementary shape to the corresponding hollow from radial displacement when such a cylinder is slid into said hollow.

The present invention also provides a modular block for making constructions, characterized in that it comprises a body whose outer shape is cubic, including three groups of cylindrical hollows opening out respectively in three contiguous faces of said cube, each group of cylindrical hollows including at least two cylindrical hollows whose generator line is perpendicular to the plane of the faces into which they open out, with the two hollows having at least two lines in common and with the hollows forming partially closed curves suitable for preventing a cylinder of complementary cross-section to the section of a hollow into which it is slid from moving radially.

BRIEF DESCRIPTION OF THE DRAWINGS

Embodiments of the invention are described, by way of example with reference to the accompanying drawings, in which:

FIG. 4 shows an example of a structure built using the modular blocks of the type shown in FIGS. 1 to 3; and FIG. 5 shows an advantageous method of making a structure with the modular blocks of FIGS. 1 to 3, in cooperation with an additional finishing block in accordance with the invention.

MORE DETAILED DESCRIPTION

All of the figures show the same embodiment of a modular construction block in accordance with the invention and the same references are used in the figures for designating the same items, regardless of the figure in which the items appear.

Figure 1:
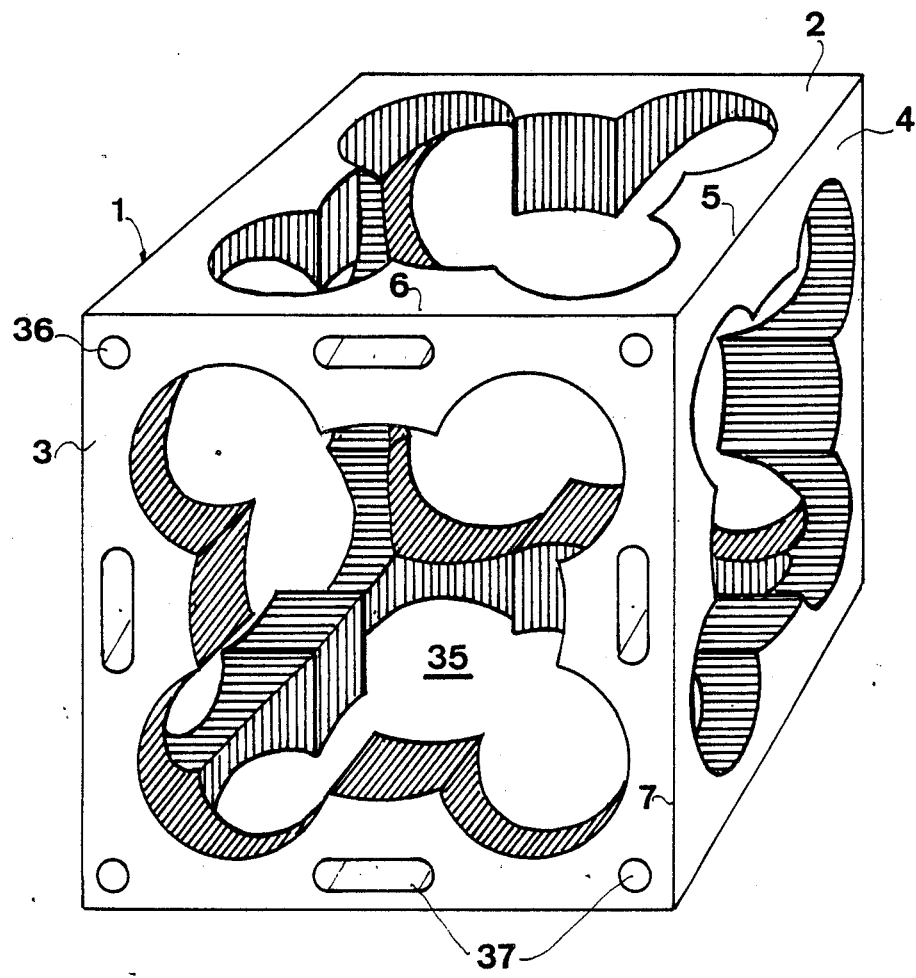
FIG. 1 is a perspective view of one embodiment of a modular construction block in accordance with the invention.
Figure 2:
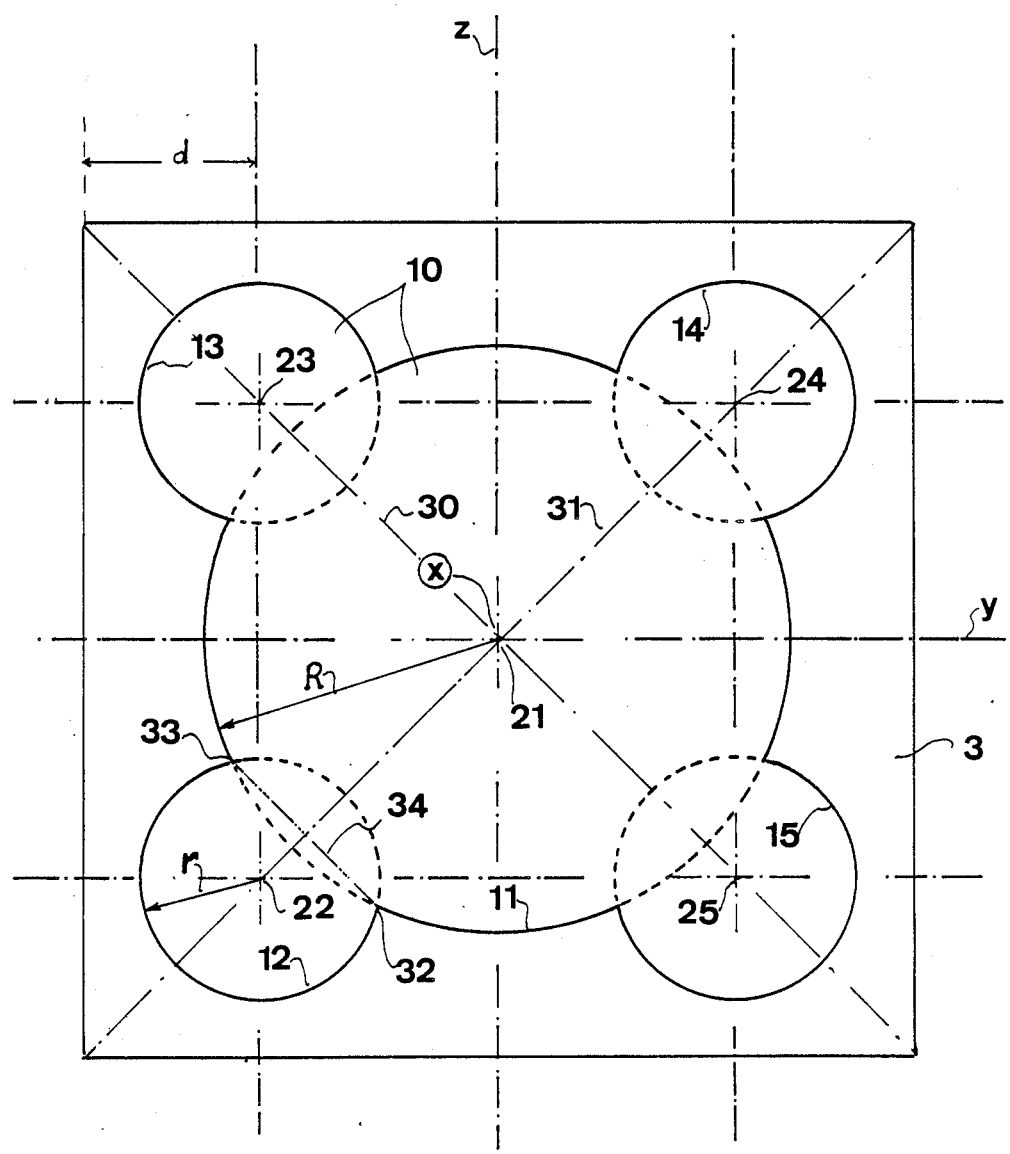
FIG. 2 is a front view of the FIG. 1 modular block.

The modular block shown more particularly in FIGS. 1 and 2 is constituted from a part in the shape of a cube 1 defined by at least three faces 2, 3, and 4, which are perpendicular to one another in this case. The perpendiculars to these faces therefore determine, in this case, a rectangular frame of reference suitable for defining three reference axes generally called Ox, Oy, Oz. Groups of hollows are formed in this cube opening out into at least three of its faces, said groups of hollows 10 being defined by plural laterally intersecting hollows which are cylindrical in shape and each hollow having its generator line extending perpendicularly to the face into which it opens out.

Advantageously, as shown in the figures, each cylindrical hollow passes right through the cube and opens out into two opposite parallel faces, as can be seen clearly in FIG. 1.

In order to use such modular blocks for building structures as explained below, the hollows are identical in shape, and in order to obtain a combination of stiffness and lightness, there are at least two cylindrical hollows opening out into each face, which hollows have generator lines in common at their intersection in order to define a common plane opening between two cylindrical hollows. Further, as explained below, these hollows are intended to receive complementary cylindrical male parts suitable for entering said hollows and sliding therealong. The section of each of two intersecting cylindrically hollows in a plane perpendicular to their generator lines is thus in the form of a partially closed concave curve such that when a male part is received in either hollow, it cannot slide sideways into an adjacent hollow through the plane opening between the hollows.

FIG. 2 shows an advantageous shape for such hollows applicable to the selected cube base shape. The cube part 1 thus has three groups 10 of laterally intersecting cylindrical hollows passing through it parallel to three axes x, y, z corresponding to its three edges 5, 6 and 7 meeting at a corner. More precisely, FIG. 2 shows the section of a group of hollows opening out in one of the six faces of the cube, in this particular case the face 3, with the sections of all of the groups of hollows being identical.

Thus, in this example shown in FIG. 2, the group of hollows 10 comprises five circularly cylindrical hollows 11, 12, 13, 14, and 15.

A first cylindrical hollow 11 whose axis 21 lies on the line of intersection between two diagonal planes 30 and 31 has a radius "R" which is large enough to ensure that the cross-section of the hollow 11 occupies a fairly large area in the face 3 of the cube 1. Advantageously, the radius "R" corresponds to the outside diameter of tubes which are readily available commercially, and these diameters are generally standardized. For example, a cube having a side of length 10 cm may advantageously have a radium "R" of 3.15 cm.

The other four hollows 12-15 are of circular cylinder form whose axes 22, 23, 24, and 25 are respectively situated in the two diagonal planes 30 and 31 but lie outside the central cylinder 11. These four cylindrical hollows have the same radius "r" which is considerably less than the radius of the central hollow 11, and here again it is advantageous for the radius "r" to correspond to the outside diameter of a standard size of tube. In the above example, the radius "r" would be 1.6 cm.

However, as explained above, it is necessary for the central cylindrical hollows 11 to have two lines at the intersection with cylinders 12-15 in common with those of each of the outer cylindrical hollows 12-15 and to ensure that a tube inserted into one of the outer cylindrical hollows cannot slide into the central cylindrical hollow through the common plane opening 34 therebetween. It is therefore necessary for the distance between the axis 21 of the central cylindrical hollow 11 and each of the axes 22-25 of the outer cylindrical hollows to be less than the sum of their radiuses "R+r", but considerably greater than the larger radius, i.e. "R".

This structural feature makes it possible, for example, for the hollow 11 and the hollow 12 to have two lines 32 and 33 in common which define a plane opening 34 therebetween whose width is necessarily less than the diameter of the hollow 12, and a fortiori less than the diameter of the hollow 11.

Naturally, for reasons of symmetry and of structural strength, the other groups of hollows 11-13, 11-14, and 11-15 have the same configuration.

Figure 3:
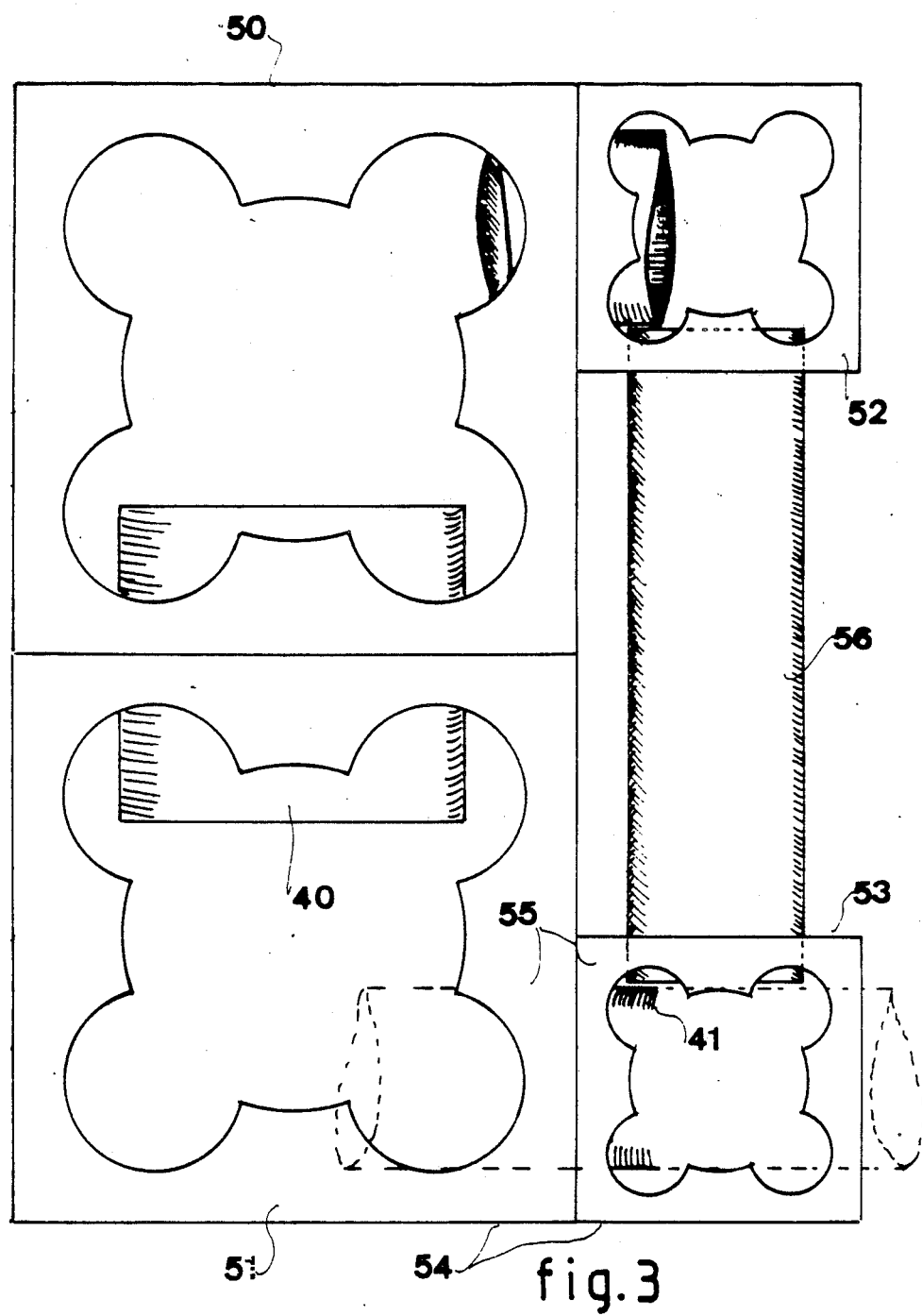
FIG. 3 is a front view of an assembly of modular construction blocks as shown in FIGS. 1 and 2.

Under these conditions, when the central hollow 11 receives a cylindrical tube 40 (FIG. 3), this tube is properly held in sideways directions and cannot slide into any of the adjacent hollows via a common plane opening 34. Similarly, when a tube 41 is received in an outer hollow, it too cannot slide into the central hollow 11 via the common plane opening 34 (FIG. 3).

The advantage of such a modular construction block can thus be seen. By virtue of the three groups of hollows, the cube is almost completely hollowed out, losing about 0.857 of its initial mass, while still retaining substance along all of its edges 5, 6, 7, . . . , thereby giving it the desired stiffness and strength. The hollowed out inside portion 35 of this tube 1 can clearly be seen in FIG. 1.

Finally, it is obvious that this modular block could be made of any solid material, but advantageously it is made of polycarbonate (PC) or polyoxyphenylene (PPO) which give a very good stiffness/weight ratio. In addition, these materials are suitable for industrially manufacturing such modular blocks by molding rather than by time consuming and expensive machining of individual parts.

These modular blocks can be assembled to one another by superposing them face to face in order to constitute large volumes.

FIG. 3 shows an example of an assembly of two blocks 50 and 51 which are juxtaposed and firmly associated. As mentioned above, two blocks 50 and 51 may be assembled by placing a tube 40 in the central hollow 11 of each of the blocks and by pressing the blocks against one another, and holding them together, if necessary, by spots of glue.

The use of such a tube 40 naturally improves the stiffness of the structure, particularly when a very large number of modular blocks are to be assembled.

However, when assembling only a small number of modular blocks, external spot fixing means may be used on their own. To this end, the faces of cubes 1 have notches 36, 37, . . . disposed symmetrically around the periphery of the openings to the groups of hollows. These notches are suitable for receiving clips capable of co-operating with two notches belonging to two blocks which are juxtaposed face-to-face. In order to simplify the drawing, FIG. 1 shows only those notches which occur in the face 3 of the cube 1, however it is obvious that all the other faces 2, 4, . . . of the cube would include similar notches. Clips have the advantage, compared with tubes 40, of being lighter while nevertheless holding the blocks fixed together. Such clips are known per se, and are not described in greater detail below.

As mentioned above, these modular blocks can be used for constructing models, or the like, which are large in size. However, the appearance of some such models may require construction blocks to be used which are smaller than 10 cm side cubes as described by example above. For example, it may be useful to have modular blocks in the form of cubes having a side of 5 cm, as shown at 52 and 53 in FIG. 3. Such modular blocks advantageously have the same shape as the block described with reference to FIGS. 1 and 2. However, the central cylindrical hollow should have a radius equal to the radius of a peripheral cylindrical hollow 12 to 15 in a 10 cm block. Thus, in order to assemble a smaller block 52 or 53 with a larger block such as that shown in FIGS. 1 and 2 occupying eight times the volume, a tube 41 is placed in a peripheral hollow 12-15 of the cube 1 and in the central hollow of one of the blocks 52-53. It is then advantageous to select the positions of the axes 22-25 of the peripheral hollows 12-15 at a distance "d" equal to one fourth of the side of the large modular block away from the two faces which are closest thereto, and to choose the value of the radius "R" to be less than $x/2\sqrt{2} = 0.3535\,x$, where x is the side of the cube 1. In this case, the distance of each axis 22-25 of an outer hollow from the closest edge is 0.35355 x.

Thus, the block 52 or 53 may be associated with the block 50 or 51 and may be accurately located on the corner of one of the faces of the larger element, thereby extending two surfaces 54 and 55.

In some applications, two blocks 52 and 53 may be associated with each other while being spaced apart on a common tube 56, as shown in FIG. 3. FIG. 4 shows a fragment of an application of modular blocks such as those described with reference to FIGS. 1, 2, and 3 in the construction of a bulk product 60. In order to make the product 60, as many modular blocks 61, 62, 63, . . . as are required as assembled in order to fill as much as possible of the space contained within the final envelope 64 of the finished product 60, so that the distance from each point of the envelope 64 from a modular block is less than the size of the smallest modular block that could have been used, while none of the modular blocks actually used projects through said envelope 64.

The assembly of these blocks 61, 62, 63, . . . constitutes a relatively compact rigid shape which is easily made by stacking the blocks and which is practically undeformable. Once this shape has been completed, additional elements 66, 67, 68, . . . such as strips of wood or other material having a cut, polished, worked, . . . face are placed around the rigid shape to give the finished product 60 the desired shape.

In an advantageous embodiment, these additional elements are obtained, as shown in FIG. 5, from rectangular blocks 90 of square section equal to the section of the modular blocks 91, 92, 93, and of length 94 equal to or slightly greater than twice the side 95 of the modular blocks. These additional blocks include means 98 on their furthest apart end faces 96 and 97 for co-operating with the modular blocks, e.g. by being received in their groups of hollows 99, or in their notches 37 (FIG. 1).

These additional blocks can thus be cut into two finishing blocks 101 and 102 in order to form the side surface 64 described with reference to FIG. 4, thereby losing a minimum of substance 103.

It can be seen that using modular blocks in accordance with the invention to which additional finishing blocks are advantageously added, it is possible to make a model, for example, having the main advantage obtained by the "solid" technique, i.e. stiffness, together with the advantage obtained by the technique of a frame covered by a "skin", namely lightness. It should also be observed that the technique of assembling modular blocks in accordance with the invention is very simple and does not require highly qualified personnel.

It is thus possible to make, in particular, strong and light models, even at life size, of cars, airplanes, rockets, etc. which are not fragile during transport and on which technicians can work without fear.

In the claims:

1. A modular block for making constructions, said block comprising a body having:
    at least three contiguous plane faces such that perpendiculars to any two of each of said contiguous faces form a rectangular frame of reference; and
    three groups of laterally intersecting, parallel cylindrical hollows, each hollow opening out into a respective one of said contiguous faces and each group of said hollows comprising at least two of said hollows, the generator line of each of the hollows in a group being perpendicular to the face into which said hollow opens out, each cylindrical hollow within a group including two lines in common with another cylindrical hollow within the group at the lateral intersection therebetween, the outline of each group of hollows forming an opening of corresponding outline along the respective face of the body, and wherein a section of each cylindrical hollow forms a partially closed curved surface for receiving a cylinder of complementary shape to the hollow and preventing the cylinder, when received therein, from moving radially within the cylindrical hollow receiving said cylinder.

2. A modular block for making constructions, said block comprising a cube having three contiguous faces, said block including three groups of laterally intersecting, parallel cylindrical hollows opening out respectively in said three contiguous faces of said cube, each group of cylindrical hollows comprising at least two cylindrical hollows, each hollow having a generator line perpendicular to the plane of the face into which the cylindrical hollow opens out, each hollow in a group having two lines in common with another hollow in the group at the lateral intersection therebetween, the outline of each group of hollows forming an opening of corresponding outline along the respective face of the cube, and each hollow forming a partially closed curved surface for receiving a cylinder of complementary cross-section such that said cylinder is prevented from moving radially within the hollow receiving the cylinder.

3. A block according to claim 2, wherein said groups of cylindrical hollows each comprise five cylindrical hollows.

4. A block according to claim 3, wherein said five cylindrical hollows are disposed so as to have a central hollow whose axis coincides with the line of intersection of the two diagonal planes extending perpendicularly from the face into which said hollows open out, with the other four hollows being distributed around the periphery of said central hollow.

5. A block according to claim 4, wherein said four peripheral cylindrical hollows have axes distributed in respective ones of said diagonal planes.

6. A block according to claim 5, wherein said peripheral cylindrical hollows are situated at equal distances from the axis of said central cylindrical hollow and all of said peripheral cylindrical hollows have the same radius of curvature "r".

7. A block according to claim 6 wherein the distance between the axes of the peripheral hollows and the axis of the central hollow is less than the sum of the radiuses of curvature "R+r" of the central hollow "R" plus one of the peripheral hollows "r", and substantially greater than the radius of curvature "R" of the central hollow.

8. A block according to claim 4, wherein said central hollow has a radius of curvature "R" which is considerably greater than the radius of curvature "r" of said peripheral hollows.

9. A block according to claim 5, wherein the distance of the axis of each peripheral hollow from the closest edge of the cube is equal to 0.3535 x, where "x" is equal to the length of said edge.

10. A block according to claim 2, wherein said hollows extend completely through said cubic body and open out in respective pairs of opposite parallel faces.

11. A block according to claim 2, wherein said faces each have a plane portion and said block further includes at least one clip-receiving notch in each plane portion of each face of said cube.

12. An assembly of at least two modular blocks for making constructions, each of said blocks comprising a cube having three contiguous faces, each said block including three groups of laterally intersecting, parallel cylindrical hollows opening out respectively in said three contiguous faces of said cube, each group of cylindrical hollows including at least two cylindrical hollows, each hollow having a generator line perpendicular to the plane of the face into which said hollow opens out, each hollow in a group having two lines in common with another hollow in the group at the lateral intersection therebetween, the outline of each group of hollows forming an opening of corresponding outline along the respective face of the cube, and each hollow forming a partially closed curved surface for receiving a cylinder of complementary cross-section such that said cylinder is prevented from moving radially within the hollow receiving said cylinder, said groups of hollows each comprising five cylinder hollows, said five cylindrical hollows being disposed so as to have a central hollow with an axis which coincides with the line of intersection of two diagonal planes extending perpendicularly from the face into which said hollows open out, with the other four hollows being distributed around the periphery of said central hollow, wherein said four peripheral hollows have axes distributed in respective ones of said diagonal planes, wherein said peripheral hollows are situated at equal distances from the axis of said central hollow and all of said peripheral hollows have the same radius of curvature "r", and wherein said at least two cubes comprise a smaller cube and a larger cube, and wherein the radius of curvature of the central hollow of the smaller cube is equal to the radius of curvature of the peripheral hollows of the larger cube, and wherein axial portions of a cylinder of complementary cross-section are received, respectively within two axially aligned hollows of abutting larger and smaller cubes such that said cylinder received therein couples said blocks together.

13. An assembly of at least two modular blocks for making constructions, each said block comprising a cube having three contiguous faces, each said block including three groups of laterally intersecting, parallel cylindrical hollows opening out respectively in said three contiguous faces of said cube, each group of cylindrical hollows including at least two cylindrical hollows having a generator line perpendicular to the plane of the face into which said hollows open out, each hollow in a group having two lines in common with another hollow in the group at the lateral intersection between said hollows, and each hollow forming a partially closed curved surface for receiving a cylinder of complementary cross-section such that said cylinder is prevented from moving radially within the hollow receiving the cylinder, and said at least two modular blocks having complementary axially aligned, cylindrical hollows receiving said cylinder and coupling said at least two modular blocks together and preventing movement of said at least two modular blocks perpendicular to the axis of said cylinder, and said assembly of modular blocks further including an additional rectangular block having a square cross-section equal to the cross-section of said at least two modular block cubes and having a length of not less than twice the side of one of said modular block cubes, said rectangular block including two end faces at opposite ends thereof and having means projecting outwardly from one of said end faces engaging a given one of said at least two modular block bodies and fitted into at least one of said cylindrical hollows formed in said three contiguous faces of said one modular block body and being coupled thereto.

14. A modular block for making constructions, said block comprising a body in the form of a cube having three contiguous faces, said block including three groups of cylindrical hollows opening out respectively in said three contiguous faces of said cube, each group of cylindrical hollows including at least two laterally intersecting, parallel circularly cylindrical hollows, each hollow having a generator line perpendicular to the plane of the face into which the hollows open out, and the outline of each group of hollows forming an opening of corresponding outline along the respective face of each cube, the distance between the axis of the two circularly cylindrical hollows being less than the sum of their radiuses of curvature and being substantially greater than the greatest radius of curvature of said two hollows so as to form a partially closed curved surface for receiving a cylinder of complementary cross-section such that said cylinder is prevented from moving radially within the hollow receiving the cylinder.

* * * * *